(12) United States Patent
Hogan et al.

(10) Patent No.: US 10,149,316 B2
(45) Date of Patent: Dec. 4, 2018

(54) METHODS AND DEVICES FOR GRANTING DPCCH BURSTS FOR ENHANCED UPLINK

(71) Applicant: TELEFONAKTIEBOLAGET LM ERICSSON (PUBL), Stockholm (SE)

(72) Inventors: Billy Hogan, Sollentuna (SE); Cagatay Konuskan, Oslo (NO); Gerardo Agni Medina Acosta, Järfälla (SE); Stéphane Tessier, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 205 days.

(21) Appl. No.: 15/024,512

(22) PCT Filed: Sep. 26, 2014

(86) PCT No.: PCT/SE2014/051124
§ 371 (c)(1),
(2) Date: Mar. 24, 2016

(87) PCT Pub. No.: WO2015/047183
PCT Pub. Date: Apr. 2, 2015

(65) Prior Publication Data
US 2016/0242204 A1   Aug. 18, 2016

Related U.S. Application Data

(60) Provisional application No. 61/883,806, filed on Sep. 27, 2013.

(51) Int. Cl.
*H04W 72/12* (2009.01)
*H04W 72/04* (2009.01)

(52) U.S. Cl.
CPC ... *H04W 72/1278* (2013.01); *H04W 72/0406* (2013.01); *H04W 72/1284* (2013.01)

(58) Field of Classification Search
CPC ....... H04L 5/14; H04L 5/1407; H04L 5/1415; H04L 5/143; H04L 1/0048; H04B 7/2121;
(Continued)

(56) References Cited

U.S. PATENT DOCUMENTS

| 8,165,099 B2 | 4/2012 | Christoffersson et al. |
| 2008/0043681 A1* | 2/2008 | Vimpari ............... H04B 7/2656 370/335 |
| 2009/0303977 A1 | 12/2009 | Hsu et al. |

OTHER PUBLICATIONS

International Search Report and Written Opinion dated Jan. 5, 2015, in International Application No. PCT/SE2014/051124, 11 pages.
(Continued)

*Primary Examiner* — Dady Chery
(74) *Attorney, Agent, or Firm* — Sage Patent Group

(57) ABSTRACT

The present invention relates to granting time intervals for transmitting a control signal burst and, more particularly, to methods and devices for granting Dedicated Physical Control Channel (DPCCH) bursts for Wideband Code Division Multiple Access (WCDMA). A base station determines whether a predetermined condition for transmitting a grant signal is satisfied and, if so, determines a schedule for receiving a control signal burst from a mobile device and transmits, in accordance with the determined schedule, the grant signal to at least said mobile device. Correspondingly, a mobile device transmits a report to a base station causing it to determine, in accordance with the report, a schedule for transmitting a control signal burst. Then the mobile device receives grant signals in accordance with the determined schedule and transmits a control signal burst in accordance with the grant signal.

38 Claims, 8 Drawing Sheets

(58) Field of Classification Search
CPC ........ H04B 7/2123; H04B 2201/70726; H04B 7/2668; H04B 7/216; H04J 2203/0069; H04W 72/04; H04W 72/12; H04W 76/00; H04Q 2213/394
USPC ....... 370/278, 335, 329, 347, 468, 342, 444, 370/441, 445, 462; 455/450, 509, 522, 455/442, 402, 67, 68, 69, 127.1, 343, 88, 455/43
See application file for complete search history.

(56) References Cited

OTHER PUBLICATIONS

3GPP, 3rd Generation Partnership Project; Technical Specification Group Radio Access Network; Continuous connectivity for packet data users (Release 11), 3GPP TR 25.903 V11.0.0, 2012, 138 pages.

* cited by examiner

METHODS AND DEVICES FOR GRANTING DPCCH BURSTS FOR ENHANCED UPLINK

CROSS REFERENCE TO RELATED APPLICATION(S)

This application is a 35 U.S.C. § 371 National Phase Entry Application from PCT/SE2014/051124, filed Sep. 26, 2014, designating the United States, and also claims the benefit of U.S. Provisional Application No. 61/883,806, filed Sep. 27, 2013. The disclosures of both applications are incorporated herein in their entirety by reference.

TECHNICAL FIELD

This disclosure relates generally to granting time intervals for transmitting a control signal burst and, more particularly, to methods and devices for granting Dedicated Physical Control Channel (DPCCH) bursts for Wideband Code Division Multiple Access (WCDMA).

BACKGROUND

CPC (Continuous Packet Connectivity), allows the user equipment (UE) to use discontinuous transmission (DTX) for DPCCH control channel in the uplink when the UE is not sending data, which saves power and increases network capacity. DPCCH bursts are control signals that enable a UE to be synchronized or connected with a network. The UE is allowed to send the DPCCH in bursts periodically to maintain synchronization or a connection with the network. When and how the UE should send the DPCCH bursts is conventionally configured by higher layers.

Experience has shown that modern networks are highly bursty. In this case, bursty transmissions may include data transmissions that are sent in short bursts, and in between the bursts are gaps when no data is sent at all. In addition, to achieve high rates in the uplink direction, it is increasingly acknowledged among network vendors that scheduling users one at a time in a Time Division (TD) scheduled manner is beneficial, since this way, only a designated user transmits control signaling or data, and there is no interference from other users, and the required high Eb/Io target can be met.

One problem with existing CPC is that, when the DPCCH burst is sent according to a pre-determined pattern, the UE has no idea whether it is going to experience a lot of interference from other UEs, or if it will experience no interference at all. If there is a lot of interference from other users during the burst, the inner loop power control in the network measures a low Signal to Interference Ratio (SIR), which will cause the UE to increase DPCCH power. When the UE transmits data again, it can transmit with too much power wasting power and causing interference in the network, especially if there is no other user interference with the data transmission. A second problem is that when the DPCCH burst is transmitted, the burst may collide with other user data transmissions, which causes interference. It may also collide with other user bursts.

CPC, as mentioned above, provides the bursts, and also DPCCH pre-ambles (prior to a user transmitting data) and DPCCH post ambles (transmitted just after a user transmits data), as illustrated in FIG. 1. A Lean Carrier solution proposes to completely remove the DPCCH bursts, and also DPCCH pre-ambles and post ambles, to remove the interference problems associated with them, as discussed above, and, in general, to reduce interference in the network. In this regard, the Lean Carrier solution aims to minimize control signaling. In the Lean carrier solution, a UE is given a grant when it needs to send data.

In some cases, it can be useful to have DPCCH bursts and DPCCH pre-ambles, and in some cases, these bursts and pre-ambles can be a problem. The bursts, particularly pre-ambles, can be useful for power control and channel tracking for a user, if the interference experienced by the bursts is similar to the interference that will be experienced when the user transmits data. However, the DPCCH bursts can be a problem if the bursts and pre-ambles/postambles are interfered with by another high rate user, and in a second case, if the bursts interfere with high rate users. CPC has no way to distinguish when a DPCCH burst will be useful or harmful. The Lean Carrier solution completely removes bursts and, therefore, cannot take advantage of when they might be useful without some modifications. In the Lean Carrier solution, the UE must always transmit data together with the DPCCH burst.

SUMMARY

Embodiments of the present invention relate to a base station and a method in a base station that is in communication with a plurality of mobile devices in a communications network, the method comprising the steps of determining whether a predetermined condition for transmitting a grant signal is satisfied and if the predetermined condition is satisfied, determining a schedule for receiving a control signal burst from the first mobile device; and transmitting, in accordance with the determined schedule, the grant signal to at least a first mobile device included in the plurality of mobile devices that causes the first mobile device to transmit the control signal burst to the base station in accordance with the grant signal.

Embodiments of the present invention also relate to a mobile device and a method in a mobile device that is in communication with a base station in a communications network, the method comprising the steps of transmitting a report to the base station that causes the base station to determine, in accordance with the report, a schedule for transmitting a control signal burst; receiving, in accordance with the determined schedule, a grant signal from the base station; and transmitting a control signal burst in accordance with the grant signal.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 1:
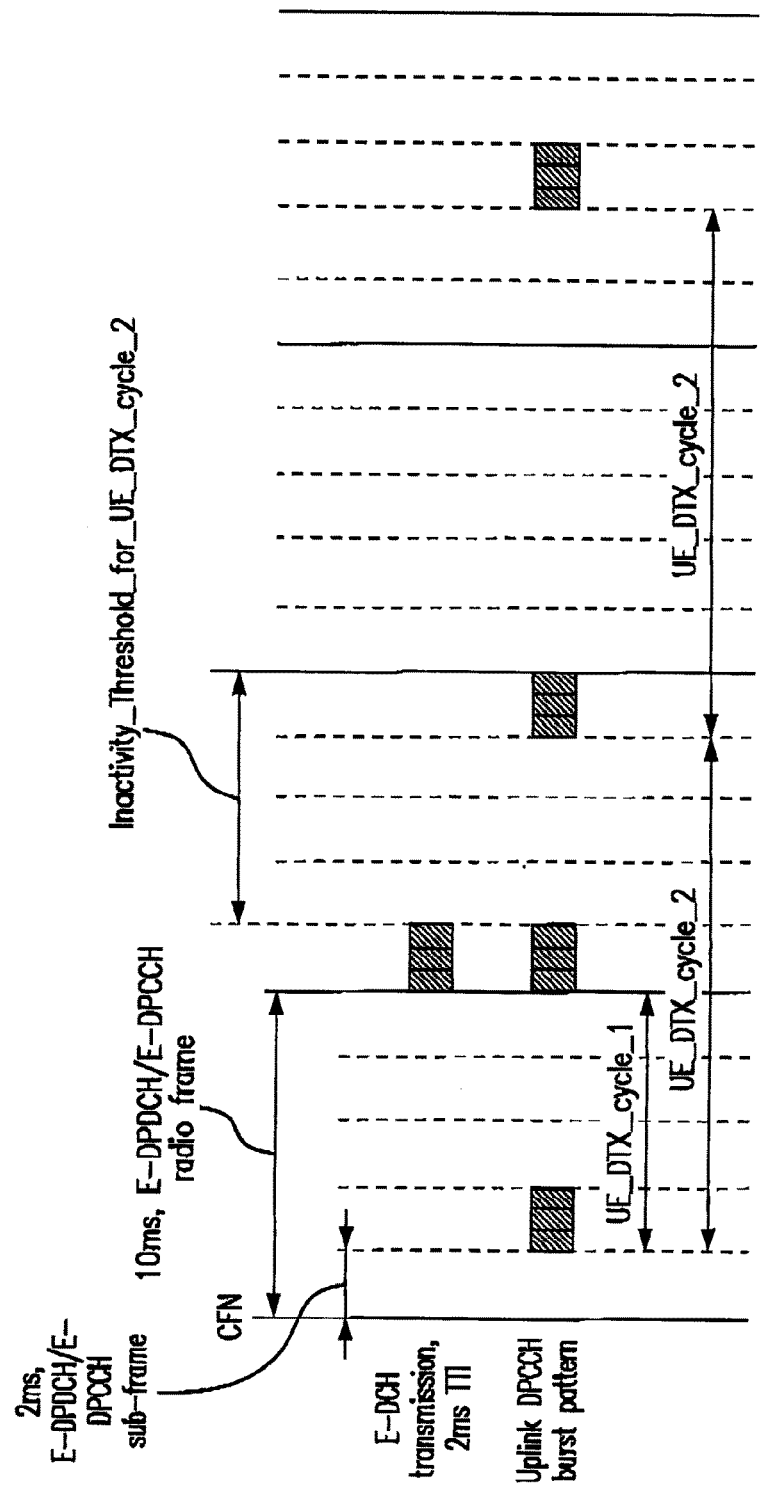
FIG. 1 is an exemplary illustration for an uplink DPCCH burst pattern.
Figure 2:
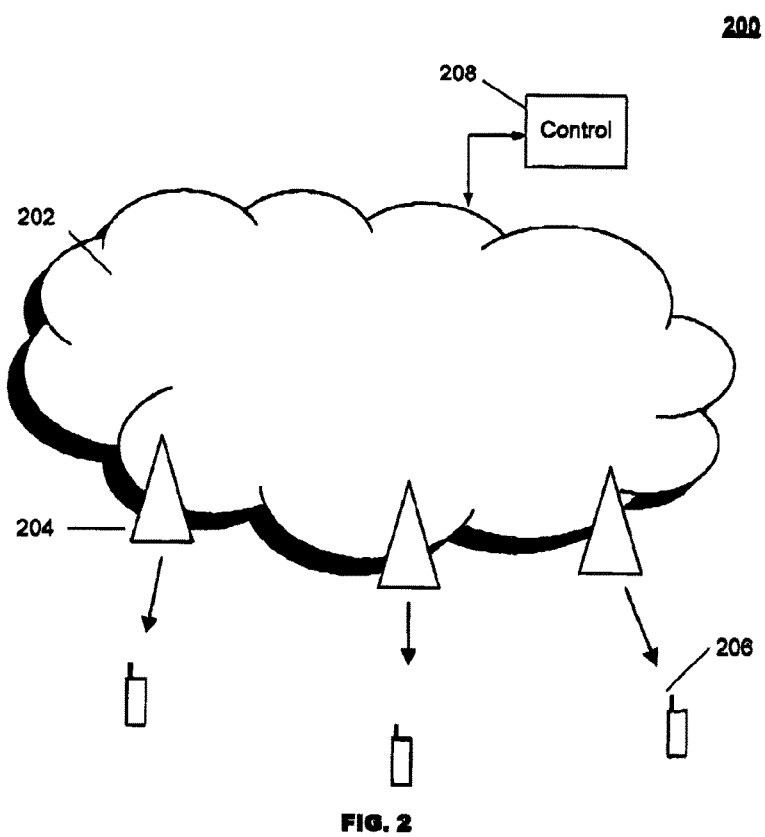
FIG. 2 is an exemplary illustration of a communications system.

Referring to FIG. 2, a wireless communication deployment 200, in accordance with exemplary embodiments, includes an access node 204 serving a wireless communication device (WCD) 206. Examples of WCDs include, but are not limited to, mobile telephones, user equipments (UEs), personal digital assistants, electronic readers, portable electronic tablets, wireless sensors, machine communication devices, personal computers, and laptop computers. Furthermore, the device 206 may be a legacy UE or dynamic TDD capable UE. Access node 204 may be, for example, a base station, a NodeB, an eNodeB, relay node, or gateway type device, and is capable of communicating with device 206, along with any additional elements suitable to support wireless communication between wireless communication devices or between a wireless communication device and another communication device, such as landline telephone. The access node 204 may be in communication with, for instance via a network 202, one or more control nodes 208, such as a Radio Network Controller (RNC), a Mobility Management Entity (MME), a Mobile Switching Center (MSC) or Base Station Subsystem (BSS). Although node 208 is explicitly identified as a control node, each of nodes 204, 206, and 208 may be understood as a "control" node to the extent that it includes a control unit or otherwise implements control functions.

According to some embodiments, a base station, such as access node 204, is able to grant a DPCCH burst or a DPCCH pre-amble or a DPCCH postamble to a user. One of ordinary skill in the art will understand that pre-ambles and postambles are examples of short DPCCH bursts. In one embodiment, the grant of a DPCCH burst is via a time limited grant sent from the scheduler. As an example, a time limited grant can be for 3 transmission time intervals (TTIs). At the end of this period, the grant expires (i.e., the burst cannot be transmitted after the grant expires). The minimum grant of a DPCCH burst can be for one 2 ms TTI or 1 slot. As an example, the time period for a TTI is 2 ms.

According to exemplary embodiments, the grant is sent even if the UE has no data in its buffer, and the UE must transmit the DPCCH burst according to the grant regardless of whether the UE has data in its buffer or not.

Higher layers such as Radio Resource Control (RRC) can be used to configure the capability to receive granted bursts.

According to some embodiments the UE reports that it has the capability to be able to receive granted bursts. The configuration for sending these reports may be done at setup of the connection as part of the UE's Lean Carrier capability, or they can be configured separately by a network. During an ongoing connection, the UE sends reports to the network that it has data to send. The network can then give a DPCCH burst grant so that the UE first sends a DPCCH burst for power control and synchronization between the UE and the network). The network can then send a data grant so that the UE can send the data after sending the DPCCH burst.

In some embodiments, when the base station receives reports from the UEs located in the cell of the base station, the base station determines a scheduling order for a grant of DPCCH bursts, and or a grant of a data burst of the UEs. For example, the base station receives reports that may specify an amount of data that the UE needs to transmit. Accordingly, the base station may prioritize the scheduling according to the amount of data that needs to be transmitted.

Figure 3:
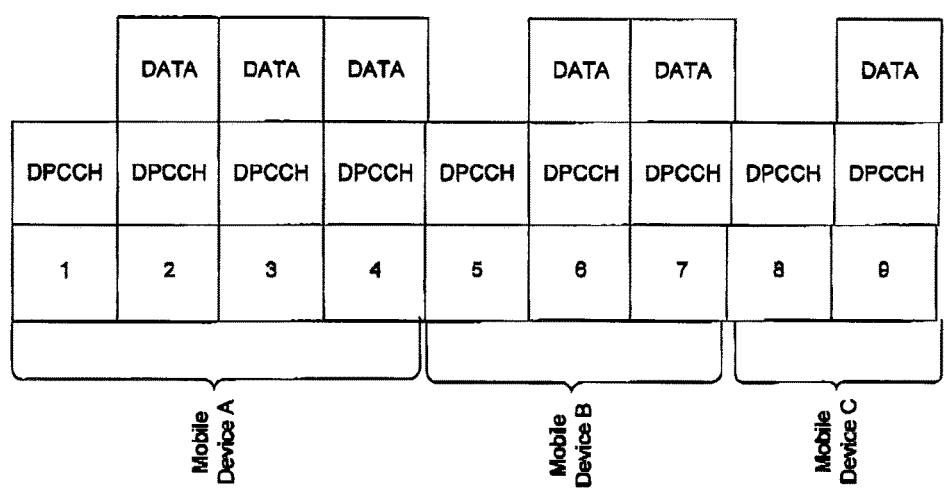
FIG. 3 is an exemplary illustration of a scheduling diagram.

FIG. 3 illustrates an example scheduling order for TTIs 1-9 for three mobile devices (UEs) A, B, and C. As an example, mobile device A may have 10 Kbytes of data to transmit, mobile device B may have 5 Kbytes of data to transmit, and mobile device C may have 3 Kbytes of data to transmit. Accordingly, the base station may schedule a limited grant for mobile device A to transmit the DPCCH burst during TTI 1 with the data bursts transmitted during TTIs 2-4, mobile device B to transmit the DPCCH burst during TTI 5 with the data bursts transmitted during TTIs 6 and 7, and mobile device C to transmit the DPCCH burst during TTI 8 with the data bursts transmitted during TTI 9. It is noted that when the UE transmits data according to the data burst, the UE sends data on the E-DCH Dedicated Physical Control Channel (E-DPDCH), and the control DPCCH together. However, the present embodiments provide the feature of granting some time where the UE sends the DPCCH burst only (i.e., TTIs 1, 5, and 8), for example, just before the UE sends the data. Although in FIG. 3 it is illustrated that a time limited DPCCH burst is granted for only 1 TTI, it is understood by one of ordinary skill in the art that the time limited DPCCH burst may be granted for more than 1 TTI.

According to some embodiments, a grant includes signaling a DPCCH burst only transmission by a time limited grant. For the Lean Carrier solution, a time limited grant is proposed. The time limited grant, sent from the Node B (i.e., base station) to the UE (i.e. mobile device) may signal a data grant value and a time length for which the grant is valid. At the end of this time length, the grant expires and is no longer valid.

In some embodiments, the grant of a DPCCH burst is done via the same time limited grant channel. The granting of a burst can then be done via a specific grant value in the grant channel corresponding to a burst or by some other mechanism using the bits in the time limited grant channel to indicate that a burst shall be transmitted. The length in time of a burst can, for example, be 3 TTIs (6 ms) and at the end of this period, the grant expires. The time length of a burst can be signaled in the time limited grant channel, in the same way as the time length for a data grant is signaled. The granularity and the time values mapped from the signaled time index to an actual time period can be different for granted data and granted DPCCH bursts. The minimum grant of a DPCCH burst can be one 2 ms TTI (3 slots) or 1 slot. As discussed above, in some embodiments, the grant is sent even if the UE has no data in its buffer, and the UE must transmit the DPCCH burst according to the grant regardless of whether it has data in its buffer or not.

According to some embodiments, a grant includes signaling a DPCCH burst transmission together with data transmission by a time limited grant. For example, the granting of a burst is performed by a combined translation of the signaled grant/time values or by using the signaled bits in the time limited grant channel. As an example, a grant may specify that the first 2 TTIs are for the DPCCH grant, and the subsequent two TTIs are for the data.

As another embodiment, the start of DPCCH burst transmission can be preconfigured by RRC signaling to a certain number of slots (or TTIs) before the start of data transmission. Also the length in time of a DPCCH burst can be preconfigured.

According to some embodiments, a DPCCH burst can be transmitted when the UE receives a grant from some other downlink channel or a HS-SCCH order. The time length of a burst can be signaled in the channel/HS-SCCH order, or it can be a preconfigured value by RRC signaling.

Figure 4:
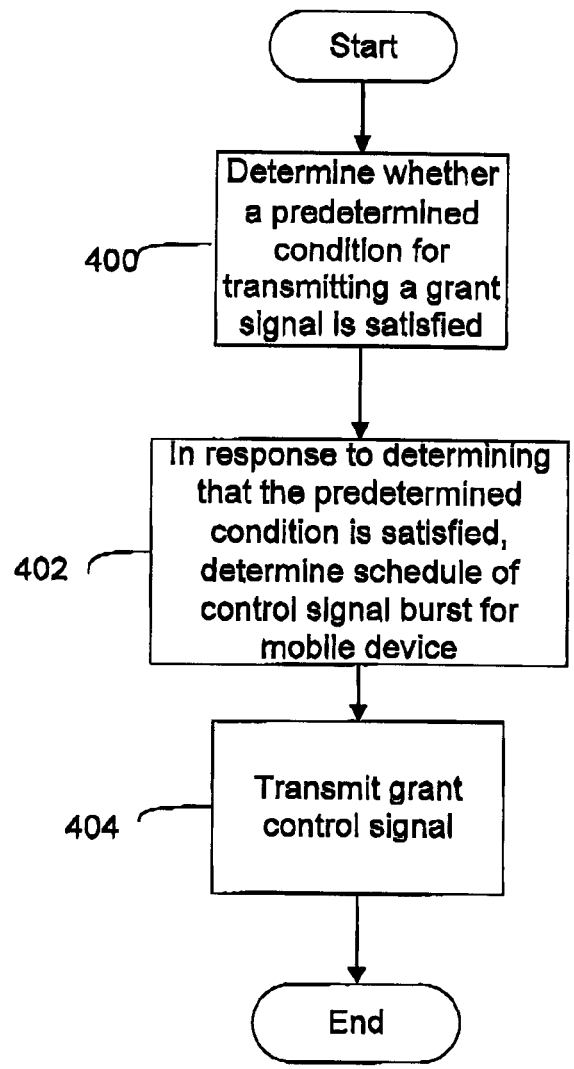
FIG. 4 is an exemplary illustration of a process performed by a base station.

FIG. 4 illustrates an embodiment of a process performed by the base station. The process may generally start at step 400, where the base station determines whether a predetermined condition for transmitting a grant signal is satisfied. In some embodiments, the predetermined condition specifies that a report is received from a mobile device. In some embodiments, the predetermined condition specifies that a predetermined period of time has elapsed since a control signal burst or data has been received from a mobile device.

If a report is received from a mobile device (i.e., a UE) the report may specify an amount of data that the mobile device needs to transmit. Furthermore, the report may be compared with other reports transmitted from other mobile devices. If the predetermined condition is satisfied, the process proceeds to step 402, where the base station determines a schedule order, such as the schedule order illustrated in FIG. 3, for the mobile device. In step 406, the base station transmits the grant for a control signal burst. In step 406, the base station may also grant a data burst based on the schedule order. Additionally, a grant for a control burst signal may be followed by a subsequent grant for a data burst.

In some embodiments, when the predetermined period has expired, the base station may decide by itself to grant a mobile device a DPCCH burst without having received any input from the UE. This situation may occur when the base station perceives that there has been a certain gap since the last data or DPCCH burst transmission from the UE, and the base station wants the UE to transmit a burst so that, for example, the base station can keep sync with the UE, or follow the fading of the radio channel, or for power control purposes.

In some embodiments, the base station can also choose to schedule the burst so that the conditions for receiving the burst are most favorable for the network (e.g., minimized interference). For example, the schedule is determined so that there are no other UEs scheduled to transmit at the same time, and therefore, the burst will not suffer from interference from other UEs or cause interference to other UEs in the same cell, or in some cases, between cells where the scheduler has control over the scheduling of users in a number of cells)

Figure 5:
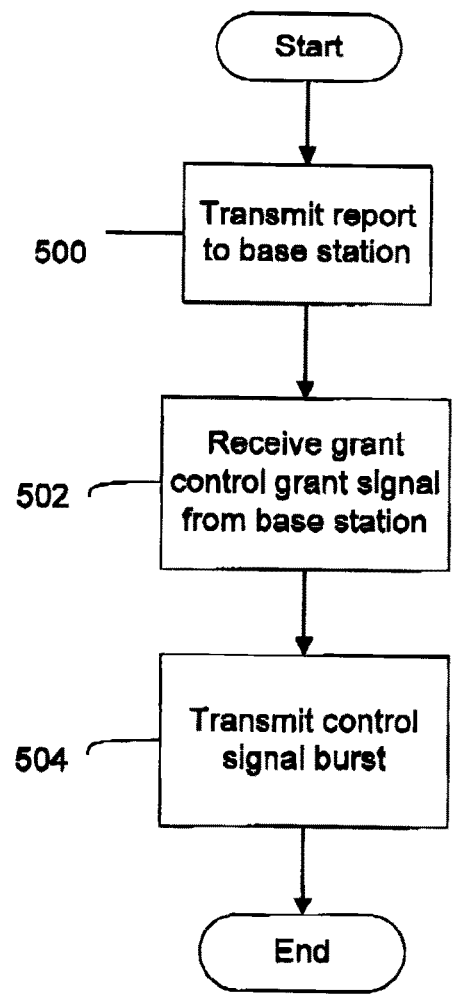
FIG. 5 is an exemplary illustration of a process performed by a wireless device.

FIG. 5 illustrates an embodiment of a process performed by the mobile device. The process may generally start at step 500, where the mobile device transmits a report to the base station. The report may specify an amount of data that the mobile device needs to transmit and serves as an indication to the base-station that the mobile device has data to send. In one example, the network decides that, prior to giving the mobile device a grant to send the data, it will first send a grant for the mobile device to send a DPCCH burst. The network then gives the mobile device a grant to send the data. The network then flexibly can decide the length of the burst that should be sent prior to the data being sent. The network may decide the length of the burst needed on, for example, instantaneous interference conditions.

In step 502, the mobile device receives the grant for the control signal burst. As an example, the grant for the control signal may specify that the mobile device needs to transmit the DPCCH burst within the next three TTI's or within a predetermined number of time slots. In step 504, the mobile device transmits the DPCCH burst in accordance with the received grant.

Figure 6:
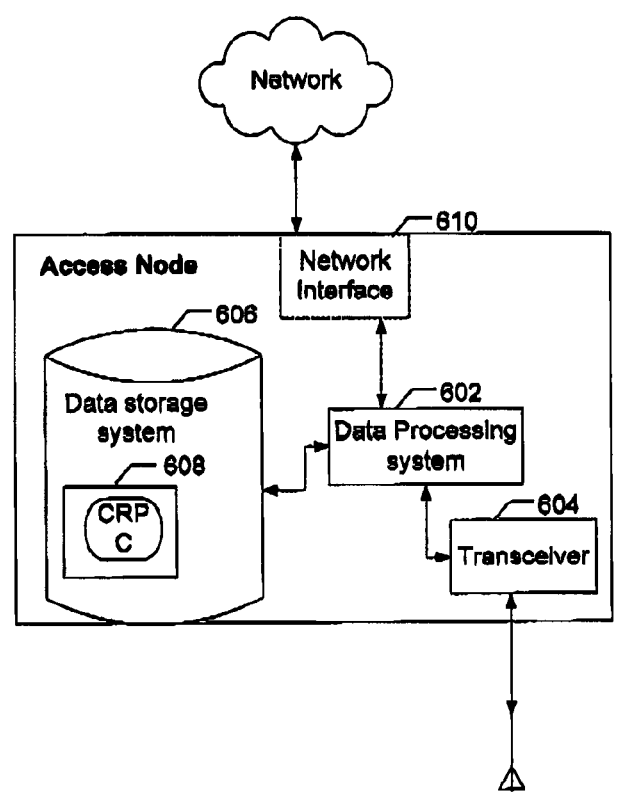
FIG. 6 is an exemplary illustration of an access node.

FIG. 6 illustrates a block diagram of an exemplary access node, such as node 204 shown in FIG. 2. As shown in FIG. 6, the access node 204 may include: a data processing system 602, which may include one or more microprocessors and/or one or more circuits, such as an application specific integrated circuit (ASIC), field-programmable gate arrays (FPGAs), and the like; a network interface 610; a transceiver 604, and a data storage system 606, which may include one or more non-volatile storage devices and/or one or more volatile storage devices (e.g., random access memory (RAM)). According to some embodiments, the data processing system 602 may comprise a control unit used for selection of transmission parameters.

In embodiments where data processing system 602 includes a microprocessor, computer readable program code (CRPC) 608 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 602 to perform steps described above (e.g., steps described above with reference to the flow chart shown in FIG. 4). In other embodiments, the access node 204 is configured to perform steps described herein without the need for code. That is, for example, data processing system 602 may consist merely of one or more ASICs. Hence, the features of the embodiments described herein may be implemented in hardware and/or software. For example, in particular embodiments, the functional components of the base station described above may be implemented by data processing system 602 executing computer instructions, by data processing system 602 operating independent of any computer instructions, or by any suitable combination of hardware and/or software.

Figure 7:
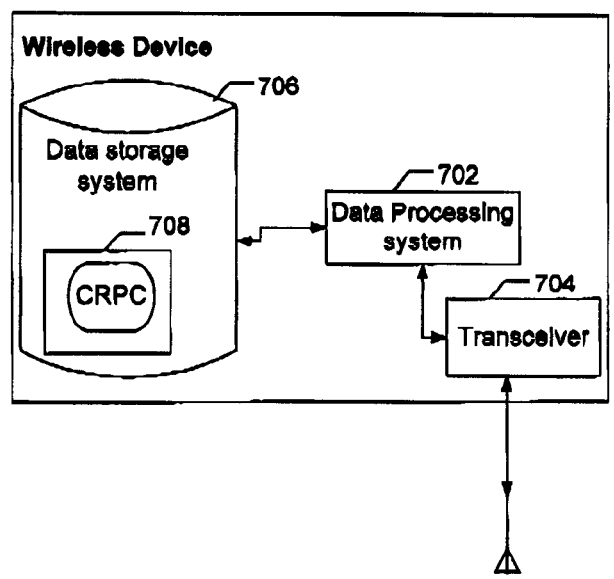
FIG. 7 is an exemplary illustration of a wireless device.

FIG. 7 illustrates a block diagram of an exemplary wireless device, such as device 206 shown in FIG. 2. As shown in FIG. 7, the device 206 may include: a data processing system 702, which may include one or more microprocessors and/or one or more circuits, such as an application specific integrated circuit (ASIC), field-programmable gate arrays (FPGAs), and the like; a transceiver 704, and a data storage system 706, which may include one or more non-volatile storage devices and/or one or more volatile storage devices (e.g., random access memory (RAM)). According to some embodiments, the data processing system 702 may comprise a control unit used for selection of transmission parameters.

In embodiments, where data processing system 702 includes a microprocessor, computer readable program code (CRPC) 708 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 702 to perform steps described above (e.g., steps described above with reference to the flow chart shown in FIG. 4). In other embodiments, the device 206 is configured to perform steps described herein without the need for code. That is, for example, data processing system 702 may consist merely of one or more ASICs. Hence, the features of the embodiments described herein may be implemented in hardware and/or software. For example, in particular embodiments, the functional components of the base station described above may be implemented by data processing system 702 executing computer instructions, by data processing system 702 operating independent of any computer instructions, or by any suitable combination of hardware and/or software.

Figure 8:
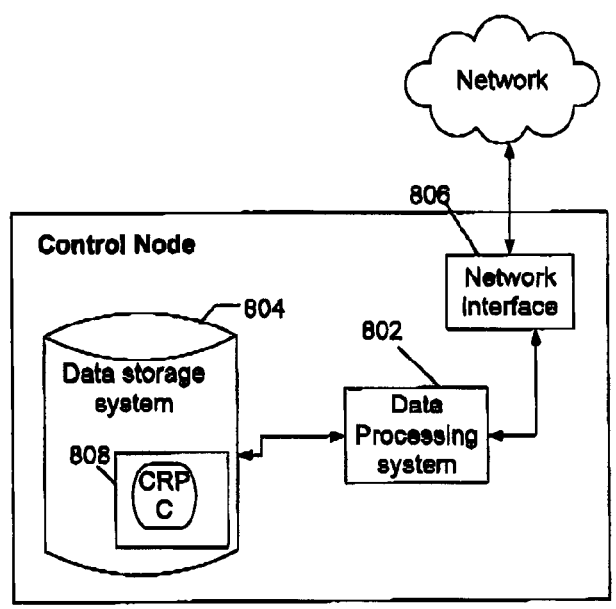
FIG. 8 is an exemplary illustration of a control node.

FIG. 8 illustrates a block diagram of an exemplary control node, such as node 208 shown in FIG. 2. As shown in FIG. 8, the control node 208 may include: a data processing system 802, which may include one or more microprocessors and/or one or more circuits, such as an application specific integrated circuit (ASIC), field-programmable gate arrays (FPGAs), and the like; a network interface 806, and a data storage system 804, which may include one or more non-volatile storage devices and/or one or more volatile storage devices (e.g., random access memory (RAM)). According to some embodiments, the data processing system 802 may comprise a control unit used for selection of transmission parameters.

In embodiments where data processing system 802 includes a microprocessor, computer readable program code (CRPC) 808 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 802 to perform steps described above (e.g., steps described above with reference to the flow charts shown in FIG. 5). In other embodiments, the control node 208 is configured to perform steps described herein without the need for code. That is, for example, data processing system 802 may consist merely of one or more ASICs. Hence, the features of the embodiments described herein may be implemented in hardware and/or software. For example, in particular embodiments, the functional components of the base station described above may be implemented by data processing system 802 executing computer instructions, by data processing system 802 operating independent of any computer instructions, or by any suitable combination of hardware and/or software.

In some embodiments, flexibility is provided where the network can choose, at any given time instant, whether the network wants a UE to send DPCCH burst or not, and when exactly it wants the burst sent. The network can choose the time when interference conditions for the UE to send the burst are most favorable for network efficiency.

Advantages of the embodiments described herein include the network being in control of the scheduled grant of all users, and on a lean carrier, the network schedules users one at a time. Furthermore, the network is aware of TTIs when no users are transmitting any data, because, i.e., none have any data to send at that instance. Additionally, the network is also in full control of who shall be allowed to send data at any given TTI in a cell (or group of cells), since it can give per TTI grants.

In some embodiments, the network can then choose to send a grant for a DPCCH burst to a user in a TTI or group of TTIs when it knows (or decides) that no other users are scheduled in that cell (or in a multi-cell scheduler for a group of cells). This gives the network a tool to be able to track the channel for the UE, when it is guaranteed that there will be no intra-cell interference from other users.

In some embodiments, when the user needs to transmit data, the network can schedule a pre-amble for the user if wanted for power control purposes prior to scheduling the user to send data. This way the network has an extra tool to gain the advantages of DPCCH bursts, without suffering any of the disadvantages.

Further advantages of the embodiments described herein include:

Even if the UE has sync on the primary carrier. The network can check if the UE has sync on the secondary carrier if needed.

The network can measure the SIR on the secondary carrier for the UE.

The network can perform a path search and initial power control without risk of having to re-transmit data.

The UE can start the data transmission on the lean carrier on the right power level.

The network can track the channel using DPCCH if wanted after long gaps where the UE has not transmitted data.

The network is able to guarantee that DPCCH bursts do not interfere with other high rate users.

The network is able to control how bursts are assigned between users.

If only a single user is transmitting on a lean carrier, the user can be granted longer or continuous DPCCH bursts for good single user performance.

There is no disadvantage in extra downlink (DL) signaling, since in a time division (TD) scheduling mode, the network should be dimensioned to be able to send per TTI grants in DL.

Complicated higher layer configuration of CPC parameters is avoided, since these embodiments do not require any special configuration.

The solution is not complicated in the situation where the UE does not go into soft handover, which is how Lean carrier is expected to be run, i.e. there is no non-serving cell.

Abbreviations

3GPP 3rd Generation Partnership Project
ACK Acknowledgement
CC Chase combining
CQI Channel Quality Information
CPC Continuous Packet Connectivity
CRC Cyclic redundancy check
DPCCH Dedicated Packet Control Channel
D-CPICH Demodulation (dedicated) Common Pilot Channel
DL Downlink
DTX Discontinuous transmission
E-AGCH E-DPDCH Absolute Grant Channel
E-DPDCH E-DCH Dedicated Physical Control Channel
E-HICH E-DCH HARQ Ack Indicator Channel
E-TFCI Enhanced TFCI
F-CPICH Fractional CPICH
GSM Global System for Mobile Communications
HARQ Hybrid automatic repeat request
HSDPA High Speed Downlink Packet Access
HS-DPCCH High Speed dedicated physical common control channel
HSPA High Speed Packet Access
HS-PDSCH High speed Physical data shared channel
HS-SCCH High Speed Shared Control Channel
IR Incremental Redundancy
LPN Low Power Node
LTE Long Term Evolution
MIMO Multiple-Input Multiple-Out-put
MMSE Minimum Mean Square Error
NAK Non-acknowledgement
PDCCH Physical Downlink Control Channel
PDSCH Physical Downlink Shared Channel
PUCCH Physical Uplink Control Channel
PCI Precoding control index P-CPICH Primary Common Pilot Channel
RAM Random Access Memory
ROM Read Only Memory
SIB System Information Block
SIMO Single input multiple output
TD Time Division
TDD Time Division Duplex
TFCI Transmit Format Combination Indicator
TTI Transmit Time Interval
Tx Transmitter
UE User Equipment
UL Up Link
USB Universal Serial Bus
WCDMA Wideband Code Division Multiple Access
WiMax Worldwide Interoperability for Microwave Access
H-RNTI High Speed Radio Network Temporary Identifier
RND Radio Network Controller
RRC Radio Resource Control
TB Transport Block
ID Identifier
W Watt Although terminology from 3GPP HSPA has been used in this disclosure to exemplify the exemplary embodiments, one of ordinary skill in the art would understand this as not limiting the scope of the present embodiments to only the aforementioned system. Other wireless systems, including LTE, LTE-A, WiMax, UMB and GSM, may also benefit from exploiting the ideas covered within this disclosure.

Furthermore, the terminology such as NodeB and UE are non-limiting and does in particular do not imply a certain hierarchical relation between the two; in general "NodeB" could be considered as device 1 and "UE" device 2, and these two devices communicate with each other over some radio channel.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method implemented in a base station that is in communication with a plurality of mobile devices in a communications network, the method comprising:
   determining whether a predetermined condition for transmitting a grant signal is satisfied by receiving a report from a first mobile device included in the plurality of mobile devices and comparing the received report with other reports received from other mobile devices, wherein the report specifies an amount of data that the first mobile device needs to transmit to the base station;
   in response to determining that the predetermined condition is satisfied, determining, a schedule for receiving a control signal burst from the first mobile device, wherein the schedule for receiving the control signal burst from the first mobile device is determined in accordance with the received report; and
   transmitting, in accordance with the determined schedule, the grant signal to at least the first mobile device included in the plurality of mobile devices that causes the first mobile device to transmit the control signal burst to the base station in accordance with the grant signal.

2. The method according to claim 1, wherein the control signal burst is a Dedicated Physical Control Channel (DPCCH) burst that is transmitted over a control channel.

3. The method according to claim 2, wherein the grant signal specifies a data rate for transmission of data over a data channel that is separate from the control channel.

4. The method according to claim 1, wherein the predetermined condition specifies receiving the report from the first mobile device included in the plurality of mobile devices.

5. The method according to claim 1, wherein the predetermined condition specifies that a predetermined period of time has elapsed since the base station received a control signal burst or data from the first mobile device.

6. The method according to claim 1, wherein the grant signal specifies a time limit in which the first mobile device must transmit the control signal burst.

7. The method according to claim 1, wherein the grant signal specifies that the first mobile device is permitted to transmit data after transmission of the control burst signal.

8. The method according to claim 1, wherein the grant signal specifies that the control signal burst must be transmitted on a control channel other than a DPCCH control channel.

9. The method according to claim 1, wherein the schedule is determined such that the first mobile device is scheduled to transmit the control signal burst during a time period in which no other mobile device included in the plurality of mobile devices is permitted to transmit the control signal burst to the base station.

10. The method according to claim 1, wherein the first mobile device is scheduled to transmit the control signal burst ahead of a second mobile device from the plurality of mobile devices that includes an amount of buffered data less than the first mobile device.

11. The method according to claim 1, wherein the control signal burst is transmitted to the base station regardless of an amount of data buffered at the first mobile device.

12. A method implemented in a mobile device that is in communication with a base station in a communications network, the method comprising:
   transmitting a report to the base station that causes the base station to determine, in accordance with the report, a schedule for transmitting a control signal burst, wherein the report specifies an amount of data that the first mobile device needs to transmit to the base station;
   receiving in accordance with the determined schedule, a grant signal from the base station; and
   transmitting a control signal burst in accordance with the grant signal;
   wherein the schedule is determined such that the mobile device is scheduled to transmit the control signal burst during a time period in which no other mobile device in communication with the base station is permitted to transmit the control signal burst to the base station.

13. The method according to claim 12, wherein the control signal burst is a Dedicated Physical Control Channel (DPCCH) burst that is transmitted over a control channel.

14. The method according to claim 13, wherein the grant signal specifies a data rate for transmission of data over a data channel that is separate from the control channel.

15. The method according to claim 12, wherein the grant signal specifies a time limit in which the mobile device must transmit the control signal burst.

16. The method according to claim 12, wherein the grant signal specifies that the mobile device is permitted to transmit data after transmission of the control burst signal.

17. The method according to claim 12, wherein the grant signal specifies that the control signal burst must be transmitted on a control channel other than a DPCCH control channel.

18. The method according to claim 12, wherein the mobile device is scheduled to transmit the control signal burst ahead of another mobile device in communication with the base station that includes an amount of buffered data less than the mobile device.

19. The method according to claim 12, wherein the control signal burst is transmitted to the base station regardless of an amount of data buffered at the mobile device.

20. A base station that is in communication with a plurality of mobile devices in a communications network, the base station comprising:
   a processor;
   a memory coupled to the processor;

a transceiver coupled to the processor; and
an antenna coupled to the transceiver configured to transmit and receive messages,
wherein the processor is configured to:
determine whether a predetermined condition for transmitting a grant signal is satisfied by receiving a report from a first mobile device included in the plurality of mobile devices and comparing the received report with other reports received from other mobile devices, wherein the report specifies an amount of data that the first mobile device needs to transmit to the base station;
in response to determining that the predetermined condition is satisfied, determine a schedule for receiving a control signal burst from the first mobile device, wherein the schedule for receiving the control signal burst from the first mobile device is determined in accordance with the received report; and
transmit, in accordance with the determined schedule, a grant signal to at least a first mobile device included in the plurality of mobile devices that causes the first mobile device to transmit the control signal burst to the base station in accordance with the grant signal.

21. The base station according to 20, wherein the control signal burst is a Dedicated Physical Control Channel (DPCCH) burst that is transmitted over a control channel.

22. The base station according to claim 21, wherein the grant signal specifies a data rate for transmission of data over a data channel that is separate from the control channel.

23. The base station according to claim 20, wherein the predetermined condition specifies receiving a report from the first mobile device included in the plurality of mobile devices.

24. The base station according to claim 20, wherein the predetermined condition specifies that a predetermined period of time has elapsed since the base station received a control signal burst or data from the first mobile device.

25. The base station according to claim 20, wherein the grant signal specifies a time limit in which the first mobile device must transmit the control signal burst.

26. The base station according to claim 20, wherein the grant signal specifies that the first mobile device is permitted to transmit data after transmission of the control burst signal.

27. The base station according to claim 20, wherein the grant signal specifies that the control signal burst must be transmitted on a control channel other than a DPCCH control channel.

28. The base station according to claim 20, wherein the schedule is determined such that the first mobile device is scheduled to transmit the control signal burst during a time period in which no other mobile device included in the plurality of mobile devices is permitted to transmit the control signal burst to the base station.

29. The base station according to claim 20, wherein the first mobile device is scheduled to transmit the control signal burst ahead of a second mobile device from the plurality of mobile devices that includes an amount of buffered data less than the first mobile device.

30. The base station according to claim 20, wherein the control signal burst is transmitted to the base station regardless of an amount of data buffered at the first mobile device.

31. A mobile device that is in communication with a base Station in a communications network, the mobile device comprising;
a processor;
a memory coupled to the processor;
a transceiver coupled to the processor; and
an antenna coupled to the transceiver configured to transmit and receive messages,
wherein the processor is configured to:
transmit a report to the base station that causes the bases station to determine, in accordance with the report, a schedule for transmitting a control signal burst, wherein the report specifies an amount of data that the first mobile device needs to transmit to the base station;
receive, in accordance with the determined schedule, a grant signal from the base station; and
transmit a control signal burst in accordance with the grant signal;
wherein the schedule is determined such that the mobile device is scheduled to transmit the control signal burst during a time period in which no other mobile device in communication with the base station is permitted to transmit the control signal burst to the base station.

32. The mobile device according to claim 31, wherein the control signal burst is a Dedicated Physical Control Channel (DPCCH) burst that is transmitted over a control channel.

33. The mobile device according to claim 32, wherein the grant signal specifies a data rate for transmission of data over a data channel that is separate from the control channel.

34. The mobile device according to claim 31, wherein the grant signal specifies a time limit in which the mobile device must transmit the control signal burst.

35. The mobile device according to claim 31, wherein the grant signal specifies that the mobile device is permitted to transmit data after transmission of the control burst signal.

36. The mobile device according to claim 31, wherein the grant signal specifies that the control signal burst must be transmitted on a control channel other than a DPCCH control channel.

37. The mobile device according claim 31, wherein the mobile device is scheduled to transmit the control signal burst ahead of another mobile device in communication with the base station that includes an amount of buffered data less than the mobile device.

38. The mobile device according to claim 31, wherein the control signal burst is transmitted to the base station regardless of an amount of data buffered at the mobile device.

* * * * *